March 11, 1952  H. L. DAVIS  2,588,967
APPARATUS FOR COATING STRIP MATERIAL
Filed May 21, 1949  2 SHEETS—SHEET 1
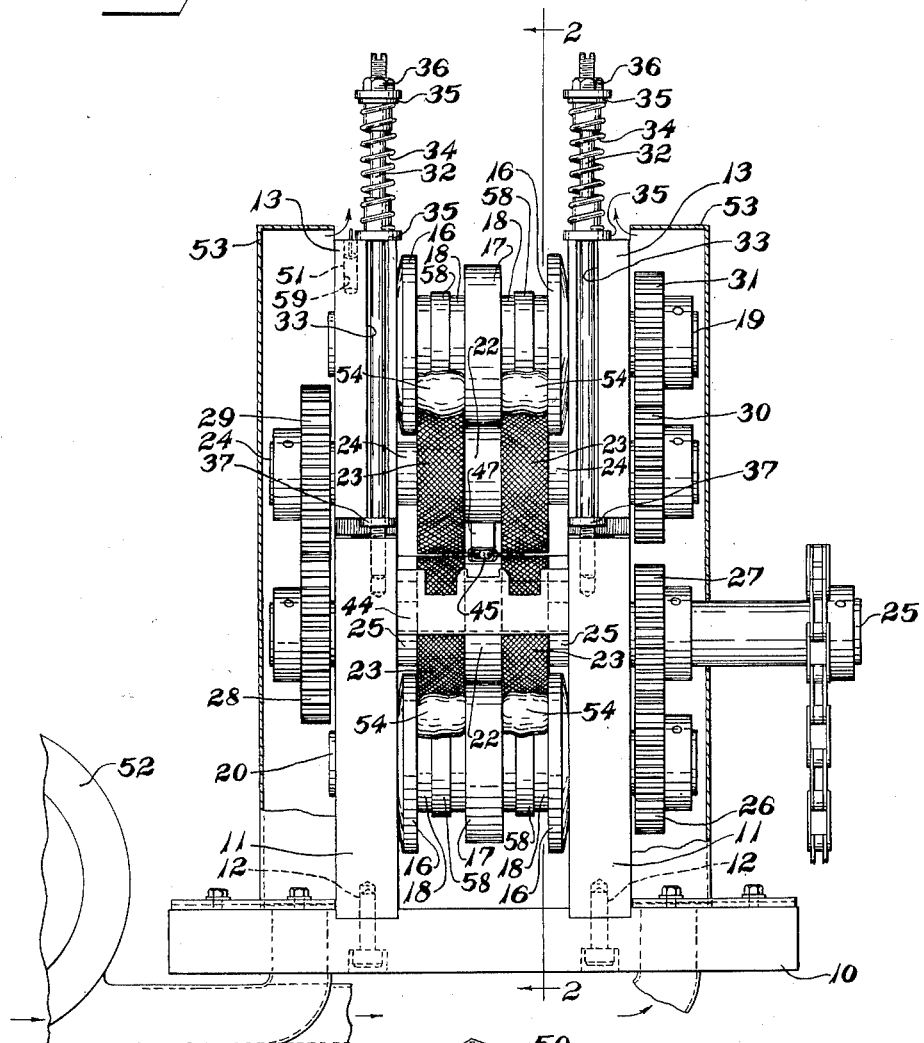
Inventor
Herbert L. Davis
By Robert W. Furlong
Atty.

March 11, 1952     H. L. DAVIS     2,588,967
APPARATUS FOR COATING STRIP MATERIAL
Filed May 21, 1949     2 SHEETS—SHEET 2
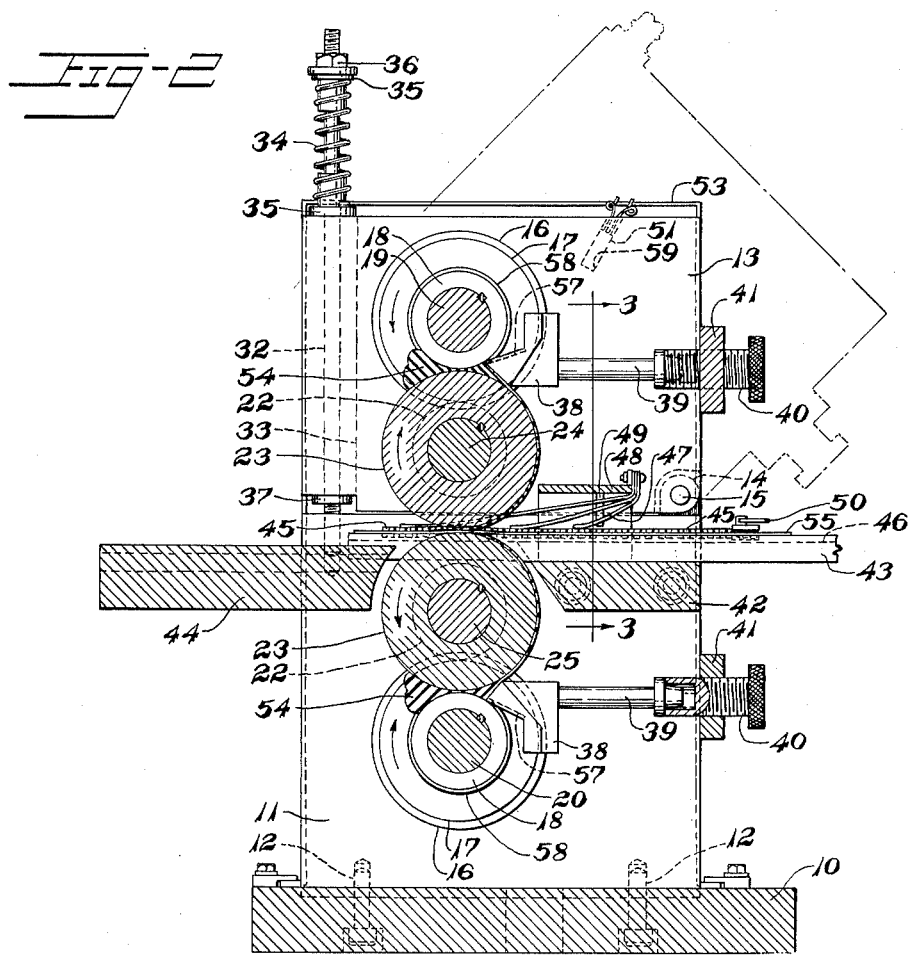
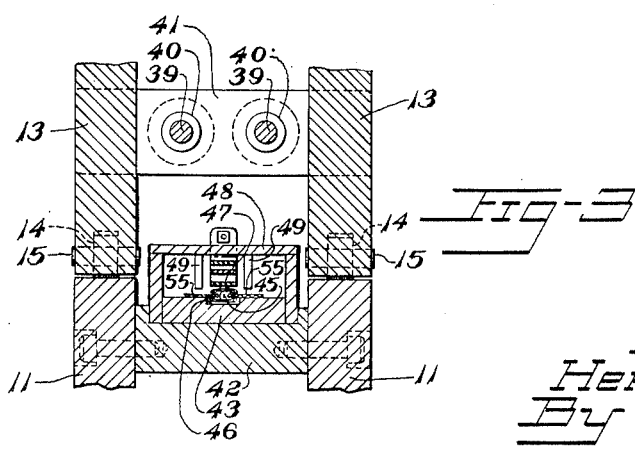
Inventor
Herbert L. Davis
By Robert W. Furlong
Att'y Patented Mar. 11, 1952

2,588,967

UNITED STATES PATENT OFFICE 2,588,967

APPARATUS FOR COATING STRIP MATERIAL

Herbert L. Davis, Walpole, Mass., assignor to The B. F. Goodrich Company, New York, N. Y., a corporation of New York Application May 21, 1949, Serial No. 94,638

15 Claims. (Cl. 118—5)

This invention relates to a method and apparatus for applying a coating of plastic or adhesive material to textile fabrics or other flexible backing material, and has particular reference to a method and apparatus for applying a coating of plastic material to one or both sides of the fabric stringers of slide fasteners.

It is an object of my invention to provide a method and apparatus for applying a coating of a plastic material to one or both sides of textile fabric.

It is also an object of my invention to provide a method and apparatus for applying a coating of plastic material of uniform and predetermined thickness to textile fabric.

A further object of my invention is to provide a method and apparatus for coating a predetermined zone of a fabric or other flexible base with a plastic material.

Another object of my invention is to provide an apparatus capable of continuously applying a coating of a plastic material to one or both sides of the fabric stringers of slide fasteners.

Other objects of my invention will be apparent from the drawings and description which follow.

It is often desirable to incorporate slide fasteners into articles made of rubber or materials similar to rubber. One method of accomplishing this union is to apply a coating of adhesive composition to the portions of the fabric stringers of the slide fastener which it is desired to unite with the rubber portion of the article, and then to press the margins of the rubber article into adhesive engagement with the coated stringers.

It is desirable to use an adhesive composition free from volatile solvents as a coating material in order to eliminate the hazard of fire and the necessity for a drying period to allow the solvents to evaporate from the coating and coated article, and to decrease the necessity for frequently interrupting the coating operation to clean the apparatus. In addition, absence of a volatile solvent prevents undesired creeping or spreading of the adhesive composition beyond the boundaries of the zone or area which it is desired to treat, and makes possible better control of the thickness and distribution of the adhesive composition.

For these reasons it is desirable to use as the adhesive composition a plastic or highly viscous material free from volatile ingredients, preferably an adhesive which is vulcanizable to form a strong bond between the parts to be adhered together. Preferably a plastic mass of vulcanizable rubber material containing vulcanizing agents, accelerators, and any other conventional compounding ingredients is employed.

To obtain a satisfactory adhesion or bonding between a coating of a viscous plastic vulcanizable rubber composition and a textile fabric or other flexible fibrous backing material the plastic coating material must be forced into the fabric or other fibrous material. Furthermore, in treating slide fasteners the adhesive must be restricted to a specified area or zone of the stringers to avoid contaminating the raceway portions of the slide fastener with gummy material which would interfere with the proper operation of the slide fastener.

The coating apparatus must be adapted to coat stringers of varying lengths, widths and thicknesses in view of the numerous sizes of slide fasteners incorporated in articles as a fastening means.

In the drawings:

Fig. 1 is a front elevation of an apparatus embodying my invention;

Fig. 2 is a section on line 2—2 of Fig. 1 showing the manner in which the upper roll assembly is pivotally mounted;

Fig. 3 is a section on line 3—3 of Fig. 2; and

Fig. 4 represents a slide fastener after the coating operation showing portions of the fabric stringers coated with a plastic material.

Referring to the drawings, the apparatus comprises a base plate 10 which forms a foundation for the lower side frames 11, 11 which are bolted to the base plate 10 by bolts 12, 12, and the upper side frames 13, 13 which are connected by hinges 14, 14 and hinge pins 15, 15 to the lower side frame 11, 11. End flanges 16, 16, center flanges 17, 17 and backing rolls 18, 18 are keyed to shafts 19, 20; spacer rolls 22, 22 and coating rolls 23, 23 are keyed to shafts 24, 25. The lower side frames 11, 11 form a housing for shafts 20, 25, and the upper side frames 13, 13 form a housing for shafts 19, 24.

Power is supplied to the apparatus through a chain and sprocket secured to shaft 25. A gear chain formed of pinion gears 26, 27, 28, 29, 30 and 31 mounted on the several shafts causes all of the shafts to rotate at the same speed, each adjacent pair of shafts being counter-rotating with respect to each other.

Positioning rods 32, 32 slide in channels 33, 33 in the upper side frames 13, 13 and screw into the lower side frames 11, 11. Compression springs 34, 34 confined between and by flanges 35, 35 and positioning nuts 36, 36 apply positive downward pressure to the upper side frames 13, 13 forcing the entire upper assembly downward. Flanges or stops 37, 37 at the lower end of the positioning rods 32, 32 prevent the compression springs 34, 34 from forcing the upper assembly down beyond a desired position and maintain the coating rolls 23, 23 in a predetermined spaced apart position.

Scraper blades 38, 38 which determine the quantity and thickness of plastic material fed onto the coating rolls 23, 23 are mounted on scraper rods 39, 39 which fit into scraper adjustment screws 40, 40 passing through support bars 41, 41 secured to the upper side frame 13, 13 and the lower side frame 11, 11.

The input guide support 42 is fitted between and bolted to the lower side frames 11, 11 and forms a support for the input guide 43 a portion of which fits into a rectangular milled cavity in the input guide support 42 preventing the input guide 43 from moving forward between the rolls or in a lateral direction. The output platform 44 is fitted and bolted to the lower side frames 11, 11 and supports one end of the input guide 43 when it is in working position, and it may further serve as a foundation for gears, rolls, etc. of a conveyor system (not shown) which would carry the coated slide fasteners to the next processing machine. The input guide support 42 and the output platform 44 further serve as spaced elements restraining the lower side frames 11, 11 from lateral motion.

The metal raceways 45 of the slide fastener fit into a guideway 46 in the input guide 43 which guides the slide fastener to the coating rolls 23, 23. Leaf springs 47, 47 of varying lengths are bolted to a guide-frame 48 and apply pressure to the metal raceways 45 preventing them from jumping out of the guideway 46. The guide-frame 48 is secured to the input guide 43 and contains guide members 49, 49 to guide the slide fastener tab 50.

A thermostatic control 51 situated in a cavity 59 in one of the upper side frames 13, 13 controls the operation of a blower fan 52 which directs cooling air through ducts against the side portions of the apparatus. Sheet metal guards 53, 53 cover the side portions of the apparatus serving not only as safety coverings over the gears, shaft ends, etc. but also forming chambers through which the cooling air flows, the air passing out of the apparatus through a space between the top of the guard and the upper side frame.

A coated slide fastener as represented in Fig. 4 consists of raceways 45, a tab 50 and stringers 55, 55. Portions of the stringers 55, 55 are coated with a layer of plastic material 56, 56.

As a convenience in maintaining the apparatus in proper working order and for ease in cleaning and lubrication the positioning rods 32, 32 may be unscrewed from the lower side frames 11, 11 and the bolts holding the sheet metal guards 53, 53 may be loosened allowing the guards 53, 53 to be moved away from the apparatus permitting the entire upper assembly to be pivoted about the hinge pins 15, 15, thereby rendering the interior portions of the apparatus readily accessible to the workmen.

Coated slide fasteners to give satisfactory service must have a strong mechanical bond between the coating and the fabric. This requires that a portion of the plastic coating be forced into the fabric material, and is accomplished in my apparatus by the pressure exerted on the coating and fabric by the coating rolls 23, 23 which receive the main portion of their pressure from the action of the compression springs 34, 34. To obtain the desired pressure when the machine is in operation the positioning rods 32, 32 are screwed into the lower side frames 11, 11, and positioning nuts 36, 36 are tightened until sufficient pressure is exerted by the compression springs 34, 34 to maintain the desired pressure between the coating rolls 23, 23 and the slide fastener stringers 51, 51. The compression spring assembly further serves the function of a relief system, so that, if foreign material passes between the coating rolls 23, 23, the entire upper assembly is allowed to pivot slightly about the hinge assembly, permitting the foreign material to pass between the coating rolls 23, 23 without damaging said rolls.

The end flanges 16, 16 and the center flanges 17, 17 restrict the plastic material 54, 54 to the peripheral surfaces of the backing rolls 18, 18. The coating rolls 23, 23 receive the plastic material diverted from the backing rolls 18, 18 by the scraper blades 38, 38. The backing rolls 18, 18 on shaft 19 and the coating rolls 23, 23 on shaft 24 are in a fixed position relative to each other allowing a predetermined thickness of plastic sheet to pass between them, and the backing rolls 18, 18 on shaft 20 and the coating rolls 23, 23 on shaft 25 are similarly arranged. Spacer roll 22 on shaft 24 prevents any lateral motion of the coating rolls 23, 23 toward each other, and the spacer roll 22 on shaft 25 serves the same function.

Although all of the rolls revolve at the same speed, the diameters of the backing rolls 18, 18 contacting the plastic material 54, 54 are smaller than the diameters of the coating rolls 23, 23, producing a differential peripheral speed between the backing rolls 18, 18 and the coating rolls 23, 23. This imparts a milling or churning to the plastic material, softening and warming it as it is applied to the rolls, and thus eliminating preheating the plastic material. Furthermore, it is a tendency of plastic material to adhere to rolls having the slower peripheral speed which in my apparatus are the backing rolls 18, 18.

The scrapers are in essence the combination of three elements, a scraper blade 38, a scraper rod 39 and an adjustment screw 40. The scraper rods 39, 39 have at one end a flanged or shoulder portion that fits into a recess in the adjustment screws 40, 40, the other end being secured to the scraper blades 38, 38. This design allows the scraper blades 38, 38 to be advanced toward or withdrawn from the surface of the rolls to permit cleaning or replacement of the blades. The scraper blades 38, 38 when in operating position extend into the bite of the backing rolls 18, 18 and coating rolls 23, 23, and the scrapers are adjusted, so that one edge of the scraper blades 38, 38 bears against the plastic sheet adhering to the backing rolls 18, 18 and diverts a desired portion of the plastic material toward the coating rolls 23, 23. A slot 57, 57 in the aforementioned scraper blade edges provides a means for returning any surplus plastic material 58, 58 to the bank 54, 54 of plastic material. A second edge on the scraper blades distributes the portion of plastic material diverted from the backing rolls 18, 18 evenly over the coating rolls 23, 23 and determines the thickness of the sheet of plastic material passed onto the coating rolls 23, 23.

The operation of the apparatus is as follows.

The positioning rods 32, 32 are screwed into the lower side frames 11, 11 and plastic material is added into the bite of the backing rolls 18, 18 and the coating rolls 23, 23. The scraper blades 38, 38 are adjusted by the scraper adjustment screws 40, 40 to allow a desired amount of thickness of plastic material to pass onto the coating rolls 23, 23. The positioning nuts 36, 36 are then adjusted until there is sufficient compression in springs 34, 34, so that the desired pressure is exerted on the material passing between the coating rolls 23, 23.

A slide fastener is placed on the input guide 43 with the metal raceways 45 in the closed position and seated in the guideway 46 preferably with the tab 50 farthest from the rolls. As the stringers 55, 55 pass between the coating rolls 23, 23, they are coated and impregnated with the plastic material.

This apparatus is capable of coating one or both sides of the stringers 55, 55 simultaneously. Numerous coating combinations may be effected by placing plastic material in only those banks 54, 54 which feed the roll portions which bear on the portions of the stringers 55, 55 to which it is desired to apply a coating. The coating process may be continuous and any length of slide fastener may be coated as long as plastic material is maintained in the banks 54, 54.

In addition, it will be noted that stops 37, 37, by maintaining opposed coating rolls 23, 23 in spaced apart relation, facilitate the coating of numerous short lengths of stringers since the coating rolls 23, 23 may rotate continuously, even when no stringers are passing between them, without danger of stripping the coating from one roll to the other.

At high-speed operation or when a comparatively hard plastic material is fed into the machine, heat developed by friction created by the milling action may soften the plastic material more than is desired for the coating operation. The excess heat is effectively conducted away by blowing cool air through chambers formed by the side frames of the apparatus and guards 53, 53 which are bolted to the base plate 10 and the lower side frames 11, 11. The operation of a blower fan 52 may be readily controlled by a thermostatically operated switch 51 located in a cavity in one of the upper side frames 13, 13. This method of cooling has been found more satisfactory than circulating water through inner cavities in the rolls, since water cooling chills the plastic material too suddenly, and it is extremely difficult to control the water flow so that the temperature of the plastic material is maintained within a desired temperature range.

Heretofore, it has been difficult to obtain a sharp straight line of demarcation of coating material on the fabric. My invention eliminates this difficulty, since the width of the coated portion is determined by the width of the coating rolls 23, 23.

It is obvious that minor changes in design or material may be made without departing from the scope and spirit of the invention as defined in the appended claims.

I claim:

1. Apparatus for coating an elongated flexible article comprising a plurality of opposed counter-rotating coating rolls adapted to advance said article and apply a coating thereto, means pressing said rolls toward each other, a backing roll opposed to each of said coating rolls and revolving at a lower peripheral speed than said coating roll, said backing roll being adapted to carry coating material on its face, and scraper means in the nip between each said coating roll and backing roll in the delivery region thereof adapted to scrape at least a portion of said coating material from said backing roll to the adjacent face of said coating roll.

2. Apparatus for coating an elongated flexible article comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, and scraper means in the nip between each said coating roll and backing roll in the delivery region thereof adaped to scrape at least a portion of said coating material from said backing roll to the adjacent face of said coating roll.

3. Apparatus for coating an elongated flexible article comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, scraper means in the nip between each said coating roll and backing roll in the delivery region thereof adapted to scrape at least a portion of said coating material from said backing roll to the adjacent face of said coating roll, and air cooling means for removing the heat developed in said apparatus during the operation thereof.

4. Apparatus for coating an elongated flexible article comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, scraper means in the nip between each said coating roll and backing roll in the delivery region thereof adapted to scrape at least a portion of said coating material from said backing roll to the adjacent face of said coating roll, air cooling means for removing the heat developed in said apparatus during the operation thereof, and means sensitive to temperature variations in said apparatus for controlling said cooling means.

5. Apparatus for coating the stringers of a slide fastener comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, scraper means in the nip between each said coating roll and backing roll in the delivery region thereof adapted to scrape at least a portion of said coating material from said backing roll to the adjacent face of said coating roll, and guide means to receive the teeth of a slide fastener and guide it to the coating rolls.

6. Apparatus for coating an elongated flexible article comprising a plurality of counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, and scraper means in the nip between each said coating roll and backing roll in the delivery region thereof adapted to scrape at least a portion of said coating material from said backing roll to the adjacent face of said coating roll, said scraper means including means for returning to said backing rolls any surplus coating material scraped from said backing rolls.

7. Apparatus for coating an elongated flexible article comprising a pair of opposed counter-rotating coating rolls adapted to advance said article and apply a coating thereto, at least one of said rolls being mounted for pivotal movement to and from an operating position in which the peripheral surfaces of said rolls are closely adjacent each other, a counter-rotating backing roll opposed to each said coating roll and mounted for pivotal movement therewith, said backing roll being adapted to carry coating material on its face, means for yieldingly urging said coating rolls toward each other, stop means for positively maintaining a predetermined interval between the peripheral surfaces of said coating rolls, and scraper means in the nip between each said coating roll and backing roll in the delivery region thereof adapted to scrape at least a portion of said coating material from said backing roll to the adjacent face of said coating roll.

8. Apparatus for coating an elongated flexible article comprising a pair of opposed counter-rotating coating rolls adapted to advance said article and apply a coating thereto, at least one of said rolls being mounted for pivotal movement to and from an operating position in which the peripheral surfaces of said rolls are closely adjacent each other, a counter-rotating backing roll opposed to each said coating roll and mounted for pivotal movement therewith, means for yieldingly urging said coating rolls toward each other, stop means for positively maintaining a predetermined interval between the peripheral surfaces of said coating rolls, air cooling means for removing the heat developed in said apparatus during the operation thereof, and means sensitive to temperature variations in said apparatus for controlling said cooling means.

9. Apparatus for coating an elongated flexible article comprising a pair of opposed counterrotating coating rolls adapted to advance said article and apply a coating thereto, at least one of said rolls being mounted for pivotal movement to and from an operating position in which the peripheral surfaces of said rolls are closely adjacent each other, a counterrotating backing roll opposed to each said coating roll and mounted for pivotal movement therewith, said backing roll being adapted to carry coating material on its face, means for yieldingly urging said coating rolls toward each other, stop means for positively maintaining a predetermined interval between the peripheral surfaces of said coating rolls, and scraper means in the nip between each said coating roll and backing roll in the delivery region thereof adapted to scrape at least a portion of said coating material from said backing roll to the adjacent face of said coating roll, said scraper means including means adapted to return to said backing rolls any surplus coating material scraped from said backing rolls.

10. Apparatus for coating an elongated flexible article comprising a first frame including a coating roll and a backing roll adapted to carry coating material on its face opposed to said coating roll, said rolls being rotatably mounted therein, a second frame including a coating roll and a backing roll adapted to carry coating material on its face opposed to said coating roll, said rolls being rotatably mounted therein, said frames being pivotally secured together about an axis remote from said rolls for movement to and from an operating position in which the coating rolls of said frames have their peripheral surfaces closely adjacent each other, means yieldingly urging said frames including said coating rolls toward each other, stop means for positively maintaining a predetermined interval between the peripheral surfaces of said opposed coating rolls, means for rotating said coating rolls and said backing rolls in opposite senses to advance said article between said coating rolls and apply a coating thereto, and scraper means in the nip between each said coating roll and backing roll in the delivery region thereof adapted to scrape at least a portion of said coating material from said backing rolls to the adjacent face of said coating roll.

11. Apparatus for coating an elongated flexible article comprising a first frame including a coating roll and a backing roll opposed to said coating roll, said rolls being rotatably mounted therein, a second frame including a coating roll and a backing roll opposed to said coating roll, said rolls being rotatably mounted therein, said frames being pivotally secured together about an axis remote from said rolls for movement to and from an operating position in which the coating rolls of said frames have their peripheral surfaces closely adjacent each other, means yieldingly urging said frames including said coating rolls toward each other, stop means for positively maintaining a predetermined interval between the peripheral surfaces of said opposed coating rolls, means for rotating said coating rolls and said backing rolls in opposite senses to advance said article between said coating rolls and apply a coating thereto, air cooling means for removing the heat developed in said apparatus during the operation thereof, and means sensitive to temperature variations in said first frame for controlling said cooling means.

12. Apparatus for coating an elongated flexible article comprising a first frame including a coating roll and a backing roll adapted to carry coating material on its face opposed to said coating roll, said rolls being rotatably mounted therein, a second frame including a coating roll and a backing roll adapted to carry coating material on its face opposed to said coating roll, said rolls being rotatably mounted therein, said frames being pivotally secured together about an axis remote from said rolls for movement to and from an operating position in which the coating rolls of said frames have their peripheral surfaces closely adjacent each other, means yieldingly urging said frames including said coating rolls toward each other, stop means for positively maintaining a predetermined interval between the peripheral surfaces of said opposed coating rolls, means for rotating said coating rolls and said backing rolls in opposite senses to advance said article between said coating rolls and apply a coating thereto, scraper means in the nip between each said coating roll and backing roll in the delivery region thereof adapted to scrape at least a portion of said coating material from said backing roll to the adjacent face of said coating roll, and means on said scraper devices adapted to return to said backing rolls any surplus coating material scraped from said backing rolls.

13. Apparatus for coating an elongated flexible article comprising a plurality of opposed counter-rotating coating rolls adapted to advance said article and apply a coating thereto, means pressing said rolls toward each other, a backing roll opposed to each of said coating rolls, said backing roll being adapted to carry coating material on its face, scraper means in the nip between each said coating roll and backing roll in the delivery region thereof adapted to scrape at least a portion of said coating material from said backing roll to the adjacent face of said coating roll, and at least one air duct disposed over the ends of said coating rolls and said backing rolls adapted to convey cooling air against said ends of said coating rolls and said backing rolls.

14. Apparatus for coating an elongated flexible article comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, scraper means in the nip between each said coating roll and backing roll in the delivery region thereof adapted to scrape at least a portion of said coating material from said backing roll to the adjacent face of said coating roll, at least one air duct disposed over the ends of said coating rolls and said backing rolls adapted to convey cooling air against said ends of said coating rolls and said backing rolls, and means for causing cooling air to flow through each of said air ducts.

15. Apparatus for coating an elongated flexible article comprising a plurality of opposed counter-rotating coating rolls adapted to advance said article and apply a coating thereto, means yieldingly pressing said rolls toward each other, a backing roll opposed to each of said coating rolls and revolving at a lower peripheral speed than said coating roll, said backing roll being adapted to carry coating material on its face, scraper means in the nip between each said coating roll and backing roll in the delivery region thereof adapted to scrape at least a portion of said coating material from said backing roll to the adjacent face of said coating roll, at least one air duct disposed over the ends of said coating rolls and said backing rolls adapted to convey cooling air against said ends of said coating rolls and said backing rolls, means for causing cooling air to flow through each of said air ducts, and means sensitive to temperature variations in said apparatus for controlling the flow of said cooling air.

HERBERT L. DAVIS.

REFERENCES CITED

The following references are of record in the file of this patent:

UNITED STATES PATENTS

| Number | Name | Date |
| --- | --- | --- |
| 437,435 | Howe | Sept. 30, 1890 |
| 986,062 | Illingworth | Mar. 7, 1911 |
| 1,404,589 | Dixon et al. | Jan. 24, 1922 |
| 1,654,214 | Evans | Dec. 27, 1927 |
| 1,783,263 | Schnuck | Dec. 2, 1930 |
| 1,822,014 | Cosgrove | Sept. 8, 1931 |
| 2,133,933 | Daley | Oct. 18, 1938 |
| 2,198,066 | Staude | Apr. 23, 1940 |
| 2,287,905 | Richmond et al. | June 30, 1942 |